US010965697B2

(12) United States Patent
Manadhata et al.

(10) Patent No.: US 10,965,697 B2
(45) Date of Patent: Mar. 30, 2021

(54) INDICATING MALWARE GENERATED DOMAIN NAMES USING DIGITS

(71) Applicant: EntIT Software LLC, Sunnyvale, CA (US)

(72) Inventors: Pratyusa K. Manadhata, Piscataway, NJ (US); Kyle Williams, Saratoga, CA (US); Barak Raz, Sunnyvale, CA (US); Martin Arlitt, Calgary (CA)

(73) Assignee: MICRO FOCUS LLC, Santa Clara, CA (US)

( * ) Notice: Subject to any disclaimer, the term of this patent is extended or adjusted under 35 U.S.C. 154(b) by 258 days.

(21) Appl. No.: 15/884,983

(22) Filed: Jan. 31, 2018

(65) Prior Publication Data
US 2019/0238573 A1 Aug. 1, 2019

(51) Int. Cl.
*H04L 29/06* (2006.01)
*H04L 29/12* (2006.01)
*G06F 40/10* (2020.01)
*G06F 40/284* (2020.01)

(52) U.S. Cl.
CPC .......... *H04L 63/1425* (2013.01); *G06F 40/10* (2020.01); *G06F 40/284* (2020.01); *H04L 61/1511* (2013.01); *H04L 63/101* (2013.01); *H04L 63/145* (2013.01)

(58) Field of Classification Search
CPC ............... H04L 63/101; H04L 63/1408; H04L 63/1425; H04L 63/144; H04L 63/145; H04L 61/1511; H04L 2463/144; G06F 17/21; G06F 17/277
See application file for complete search history.

(56) References Cited

U.S. PATENT DOCUMENTS

| 8,260,914 | B1 | 9/2012 | Ranjan |
| 8,631,498 | B1 * | 1/2014 | Hart ..................... H04L 63/145 |
| | | | 726/25 |
| 9,245,121 | B1 | 1/2016 | Luo et al. |
| 9,479,524 | B1 | 10/2016 | Hagen |
| 9,491,142 | B2 * | 11/2016 | Xie ......................... G06F 21/53 |
| 9,516,039 | B1 | 12/2016 | Yen et al. |
| 9,516,058 | B2 | 12/2016 | Antonakakis et al. |
| 9,560,074 | B2 * | 1/2017 | Stemm .................. G06F 16/951 |
| 9,602,525 | B2 | 3/2017 | Qian et al. |

(Continued)

FOREIGN PATENT DOCUMENTS

| CN | 105024969 A | 11/2015 |
| CN | 106911717 A | 6/2017 |

(Continued)

OTHER PUBLICATIONS

Ahluwalia et al., Detecting Broad Length Algorithmically Generated Domains, Oct. 11, 2017, https://link.springer.com/chapter/10.1007/978-3-319-69155-8_2 (16 pages).

(Continued)

Primary Examiner — Linglan E Edwards

(57) ABSTRACT

In some examples, a system counts a number of digits in a domain name. The system compares a value based on the number of digits to a threshold, and indicates that the domain name is potentially generated by malware in response to the value having a specified relationship with respect to the threshold.

20 Claims, 3 Drawing Sheets

(56) References Cited

U.S. PATENT DOCUMENTS

| | | | |
|---|---|---|---|
| 9,686,291 | B2 | 6/2017 | Antonakakis et al. |
| 9,756,063 | B1 | 9/2017 | Chung |
| 9,781,139 | B2 | 10/2017 | Sofka et al. |
| 10,027,688 | B2* | 7/2018 | Perdisci .............. H04L 63/1416 |
| 10,075,458 | B2 | 9/2018 | Baughman et al. |
| 10,178,107 | B2* | 1/2019 | Havelka .............. H04L 63/1441 |
| 10,326,736 | B2* | 6/2019 | Rodriguez .......... H04L 61/3025 |
| 10,498,753 | B1* | 12/2019 | Pope ...................... G06F 16/951 |
| 10,728,266 | B2* | 7/2020 | Chailytko ........... H04L 63/1425 |
| 2012/0054860 | A1 | 3/2012 | Wyschogrod |
| 2014/0082726 | A1 | 3/2014 | Dreller |
| 2014/0196144 | A1* | 7/2014 | Trost ................... H04L 63/1408 726/22 |
| 2014/0230054 | A1 | 8/2014 | Dinerstein |
| 2015/0341379 | A1 | 11/2015 | Lefebvre |
| 2016/0065534 | A1 | 3/2016 | Liu et al. |
| 2016/0255107 | A1* | 9/2016 | Qian ................... H04L 63/1425 726/23 |
| 2016/0294852 | A1 | 10/2016 | Hagen |
| 2016/0337391 | A1 | 11/2016 | McKinney |
| 2016/0352679 | A1 | 12/2016 | Josiah et al. |
| 2016/0352772 | A1 | 12/2016 | O'Connor |
| 2017/0155667 | A1* | 6/2017 | Sobel .................. H04L 63/1416 |
| 2017/0295196 | A1 | 10/2017 | Arnell et al. |
| 2017/0324757 | A1 | 11/2017 | Al-Shaer |
| 2017/0346855 | A1* | 11/2017 | Reddy .................... H04L 63/104 |
| 2018/0124020 | A1* | 5/2018 | Rodriguez .......... H04L 63/0281 |
| 2018/0176232 | A1 | 6/2018 | Rodriguez |
| 2018/0234434 | A1 | 8/2018 | Viljoen |
| 2018/0343272 | A1 | 11/2018 | Khalil et al. |
| 2019/0052650 | A1 | 2/2019 | Hu |
| 2019/0068555 | A1 | 2/2019 | Tsirkin |
| 2019/0141067 | A1 | 5/2019 | Rodriguez et al. |

FOREIGN PATENT DOCUMENTS

| | | |
|---|---|---|
| CN | 109450842 A | 3/2019 |
| WO | WO-2017030569 A1 | 2/2017 |

OTHER PUBLICATIONS

Antonakakis et al., From Throw-Away Traffic to Bots: Detecting the Rise of DGA-Based Malware, 2012 (16 pages).

Ashraf Abu-Alia, Detecting Domain Flux Botnet using Machine Learning Techniques, Feb. 2015 http://qspace.qu.edu.qa/bitstream/handle/10576/3279/Abu-Alia%2C%20Ashraf.pdf?sequence=4&isAllowed=y (104 pages).

Darling et al., A Lexical Approach for Classifying Malicious URLs, 2015, http://ieeexplore.ieee.org/abstract/document/7237040/ (8 pages).

Fu et al., Abstract Only, Stealthy Domain Generation Algorithms, Feb. 13, 2017 http://ieeexplore.ieee.org/document/7852496/ (5 pages).

HP ArcSight DNS Malware Analytics, Datasheet, Aug. 2015 (2 pages).

Martin Boasson Nordby, Security Incident Detection with Passive DNS Logs, May 2, 2014 https://www.duo.uio.no/bitstream/handle/10852/42055/Nordby-Master.pdf?sequence=29 (84 pages).

Mowbray et al., Finding Domain-Generation Algorithms by Looking at Length Distributions, 2014, https://pdfs.semanticscholar.org/bc12/34d57c2bfae6bcc6a8f1f1743ba42b8317ed.pdf (6 pages).

Osint Feeds From Bambenek Consulting, Master Feeds downloaded Jan. 3, 2018, http://osint.bambenekconsulting.com/feeds/ (3 pages).

Plohmann et al., A Comprehensive Measurement Study of Domain Generating Malware, Proceedings of the 25th USENIX Security Symposium, Aug. 2016 (17 pages).

Schiavoni et al., Phoenix: DGA-based Botnet Tracking and Intelligence , 2014 (20 pages).

Wang et al., Breaking Bad: Detecting Malicious Domains Using Word Segmentation, Jun. 2015 https://arxiv.org/pdf/1506.04111.pdf (7 pages).

Wikipedia, Botnet last edited Dec. 22, 2017 (8 pages).

Wikipedia, Edit distance last edited Dec. 29, 2017 (5 pages).

Wikipedia, Levenshtein distance last edited Jan. 6, 2018 (8 pages).

Woodbridge et al., Predicting Domain Generation Algorithms with Long Short-Term Memory Networks, Nov. 2, 2016, http://www.covert.io/research-papers/deep-learning-security/Predicting%20Domain%20Generation%20Algorithms%20with%20Long%20Short-Term%20Memory%20Networks.pdf (13 pages).

Yadav et al., Detecting Algorithmically Generated Malicious Domain Names, Nov. 1-3, 2010, http://citeseerx.ist.psu.edu/viewdoc/download?doi=10.1.1.221.1167&rep=rep1&type=pdf (14 pages).

Manadhata et al., U.S. Appl. No. 15/884,978 entitled Indicating Malware Generated Domain Names Using N-Grams filed Jan. 31, 2018 (30 pages).

Manadhata et al., U.S. Appl. No. 15/884,988 entitled Malware-Infected Device Identifications filed Jan. 31, 2018 (38 pages).

Manadhata et al., U.S. Appl. No. 16/709,637 entitled Classifying Domain Names Based on Character Embedding and Deep Learning, filed Dec. 10, 2019, (48 pages).

Manadhata et al., U.S. Appl. No. 16/433,151 entitled Determining Whether Domain is Benign or Malicious filed Jun. 6, 2019 (66 pages).

Agyepong et al; Detection of Algorithmically-Generated Malicious Domain Using Frequency Analysis; https://www.academia.edu/37302436/DETECTION_OF_ALGORITHMICALLY-GENERATED_MALICIOUS_DOMAIN_USING_FREQUENCY_ANALYSIS; 21 pages; Jun. 2018.

Anonymous, "Character level based detection of DGA Domain names", ICLR 2018, 11 pages.

Feng Zeng, et al., "Classification for DGA-based malicious domain names with deep learning architectures", International Journal of Intelligent Information System. vol. 6, No. 6, 2017, pp. 67-71.

Koh et al., "Inline Detection of Domain Generation Algorithms with Context-Sensitive Word Embeddings", Optfit LLC, Denver, Colorado; Georgia Institute of Technology, Atlanta, Georgia, Nov. 21, 2013, 6 pages. https://www.researchgate.net/publication/330632552_Inline_Detection_of_Domain_Generation_Algorithms_with_Context-Sensitive_Word_Embeddings.

Quan Le, et al., "Deep learning at the shallow end—Malware Classification for non-Domain Experts", Digital Investigation, vol. 26, Supplement, Jul. 2018, pp. S118-S126.

Shi et al., "Malicious Domain Name Detection Based on Extreme Machine Learning", School of Electronic Information and Electrical Engineering, Shanghai Jiao Tong University, People's Republic of China, Jul. 3, 2017, 11 pages. https://link.springer.com/article/10.1007/s11063-017-9666-7.

Yanchen Qiao, et al., "DGA Domain name classification method based on long short term memory with attention mechanism", Applied Sciences, MDPI, Oct. 9, 2019, 14 pages.

Zhao et al., "Malicious Domain Names Detection Algorithm Based on N-Gram", School of Computer and Communication, Lanzhou University of Technology, China; Department of Mathematics and Computer Science, Fort Valley State University, USA, Nov. 21, 2018, 10 pages. https://www.hindawi.com/journals/jcnc/2019/4612474/.

Zhauniarovich, et al; A Survey on Malicious Domains Detection through DNS Data Analysis; https://dl.acm.org/citation.cfm?doid=3236632.3191329; 3 pages; Sep. 2018.

Tom Fawcett, "An Introduction to ROC Analysis", Science Direct, Dec. 19, 2005, (14 pages).

* cited by examiner

INDICATING MALWARE GENERATED DOMAIN NAMES USING DIGITS

BACKGROUND

A piece of malware can infect a system, where the malware can perform various malicious activities. In some cases, once the malware infects a system, the malware can establish communication with a remote server that can be referred to as a Command and Control (C2) server. The C2 server can then send instructions to the malware to perform respective malicious activities.

BRIEF DESCRIPTION OF THE DRAWINGS

Some implementations of the present disclosure are described with respect to the following figures.

Figure 1:
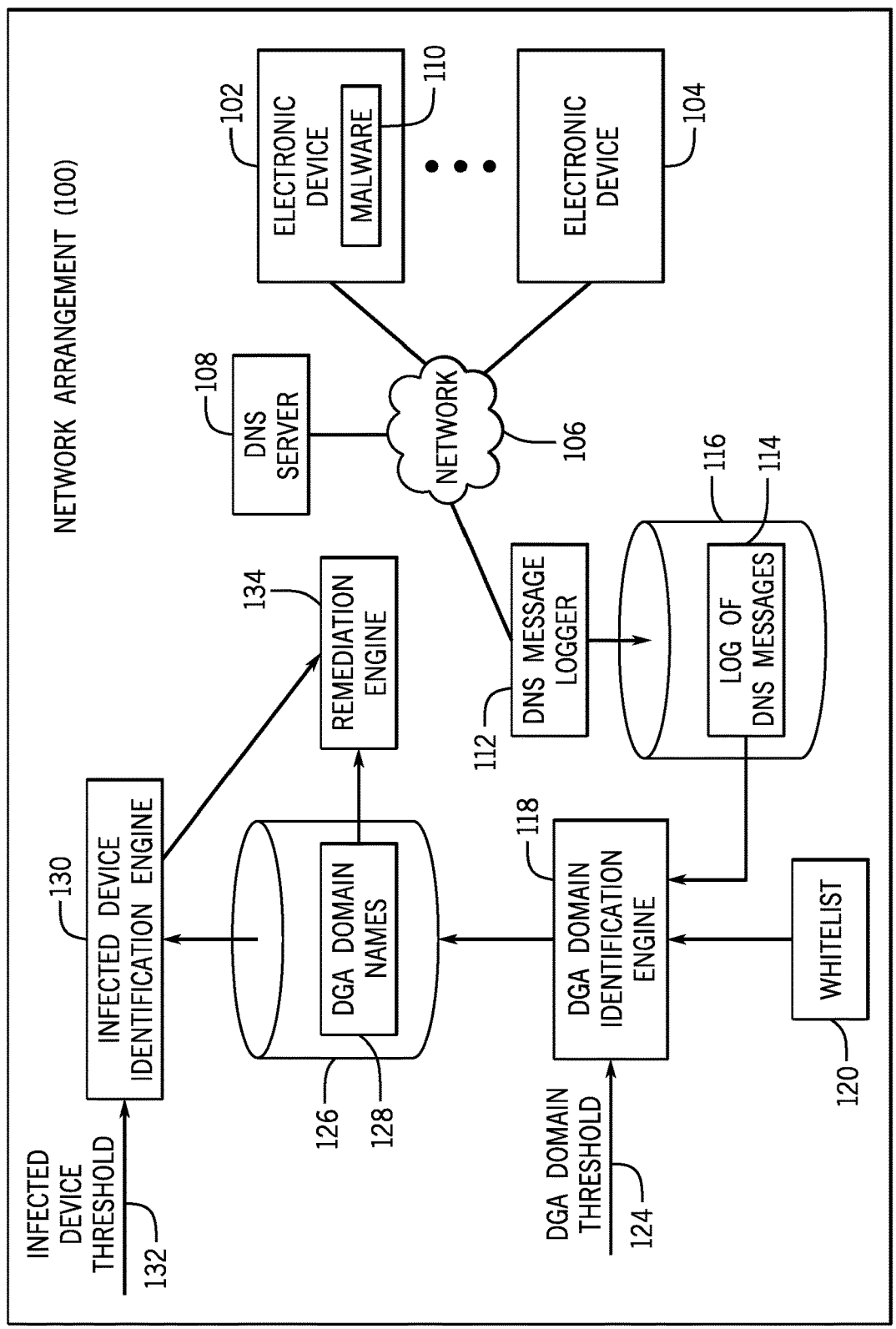
FIG. 1 is a block diagram of a network arrangement that includes a Domain Generation Algorithm (DGA) domain name identification system and an infected device identification engine, according to some examples.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

In the present disclosure, use of the term "a," "an", or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

A Domain Name System (DNS) is a component of a network that translates human-friendly domain names into computer-useable network addresses, such as Internet Protocol (IP) addresses. For example, when a user types "microfocus.com" into a web browser on an electronic device, the electronic device does not know where the web server that hosts "microfocus.com" is located. The electronic device can send a DNS query to a DNS server (or multiple DNS servers) to obtain the web server's network address, such as an Internet Protocol (IP) address.

DNS can be exploited by malware code to attack a network (such as a denial-of-service attack), to steal stored information, to transmit spam or ransomware, or to perform other malicious activities. Once a malware code infects an electronic device, the malware code may first attempt to establish communication with a remote server that is outside of a network to which the infected electronic device is attached. The remote server can be referred to as a Command and Control (C2) server. Once communication is established with the C2 server, the infected electronic device (or multiple infected electronic devices) can receive instructions to perform malicious activities from a botmaster that operates the C2 server. The botmaster can be a human, a program, or a machine. A group of infected electronic devices that are remotely controlled by the same botmaster via a C2 server can be referred to as a "botnet."

In some cases, a malware code can contact a C2 server by using an IP address from a hard-coded list of IP addresses and/or domains. However, once an instance of the malware code is detected and analyzed by anti-malware tools, the IP addresses used by the malware code can be blacklisted or sinkholed, which kills the botnet by blocking communications between C2 servers and bots (instances of the malware code).

In other cases, malware code can use Domain Generation Algorithms (DGAs) to establish communications with C2 servers. A DGA can use a starting value, called a "seed," to pseudo-randomly generate a list of domain names. When an electronic device is infected by a DGA-based malware code, the DGA-based malware code can use the seed (e.g., a current date) to generate a list of domain names, which can include tens to tens-of-thousands (or more) domain names. The C2 server can generate the same list of domain names, but picks only domain name (or a subset of the domain names) to register with a DNS ecosystem that includes DNS servers. The DGA-based malware code goes through the list of domain names and sends DNS queries for each domain name, one-by-one, until one of the domain names resolves to an IP address. If a given domain name being used by a botnet gets blacklisted or taken down, the botmaster can simply move to another domain name on the list.

In order to avoid collisions with other malware families, a malware family can use a DGA that is different from the DGAs used by the other malware families. A "malware family" refers to a family that includes a particular botmaster, C2 server(s), and DGA-based malware code that can interact with the C2 server(s) of the family. Some DGAs select letters and numbers with equal probabilities, producing domain names like "bqwqeiswupyny.org." Other DGAs simply use hash outputs, producing domain names like "5d19cbf688d4.com" with a large number of digits, which in the foregoing example includes the following digits: 5, 1, 9, 6, 8, 8, 4.

It can be difficult to reliably distinguish between benign domain names and malicious domain names (also referred to as DGA domain names) used by botnets. Some techniques for identifying DGA domain names (i.e., domain names generated using DGA) may identify benign domain names as malicious at a high rate—such techniques are referred to as techniques with high false positive rates in identifying domain names as malicious. Other techniques may fail to identify malicious domain names as malicious—such techniques are referred to as techniques with low true positive rates in identifying domain names as malicious. Additional techniques for identifying DGA domain names may be complex and may involve having to continually update a model.

In accordance with some implementations of the present disclosure, a system can count a number of digits in a domain name, where each digit is a number, a symbol, or a character that is not in a language of the domain name (non-first language character). The system compares a value based on the number of digits to a threshold, and indicates that the domain name is potentially generated by malware in response to the value having a specified relationship (less than, or greater than, equal to, or some predefined relationship) with respect to the threshold. Such an indicated domain name can be referred to as a "DGA domain name."

FIG. 1 is a block diagram of an example network arrangement 100 that includes various electronic devices 102 and 104 that are coupled over a network 106. The network arrangement 100 may be operated by an enterprise (or multiple enterprises), where an "enterprise" may refer to a company, an educational organization, a government agency, an individual, or any other entity.

Although just two electronic devices 102 and 104 are shown in FIG. 1, it is noted that in other examples, the network arrangement 100 can include a larger number of electronic devices that can communicate over the network 106. Examples of electronic devices can include any or some combination of the following: a desktop computer, a notebook computer, a tablet computer, a smartphone, a wearable device (e.g., a smart watch, smart eyeglasses, a head-mounted device, etc.), a game appliance, a server computer, a storage server, a communication node (e.g., a switch, a router, etc.), or any other electronic device.

The network 106 can be a wired network and/or a wireless network. A DNS server 108 is coupled to the network 106. Each electronic device 102 or 104 is able to submit a DNS query to the DNS server 108, where the DNS query includes a domain name. Although just one DNS server 108 is depicted in FIG. 1, it is noted that in other examples, there can be multiple DNS servers in the network arrangement 100. Moreover, it is noted that in some cases, a DNS server can be located outside the network arrangement 100. For example, the network 106 of the network arrangement 100 can be a local area network (LAN) or wide area network (WAN) that belongs to a specific enterprise. Devices in the network arrangement 100 are able to communicate with a public network, such as the Internet, that is outside of the network arrangement 100. A DNS server (or multiple DNS servers) can be coupled to the public network, and an electronic device in the network arrangement 100 is able to issue a DNS query to the DNS server(s) that is outside of the network arrangement 100.

In response to a DNS query that includes a given domain name, the DNS server 108 can access mapping information that maps domain names to respective network addresses, such as IP addresses. The network address(es) mapped to the given domain name can be returned by the DNS server 108 in a DNS response back to the electronic device that submitted the DNS query. The electronic device can then use the network address(es) to establish a communication with a destination at the network address received from the DNS server 108.

In the example of FIG. 1, it is assumed that the electronic device 102 has been infected with a malware code 110, while the electronic device 104 has not been infected with a malware code. In some examples, the malware code 110 can use DGA to produce pseudo-randomly generated domain names (referred to as "DGA domain names") that are submitted in corresponding DNS queries to the DNS server 108 (or to multiple DNS servers). In contrast, a DNS query submitted by the electronic device 104 includes a benign domain name, i.e., a domain name that is not produced using any DGA.

As further depicted in FIG. 1, a DNS message logger 112 can log DNS messages (e.g., DNS queries and/or DNS replies) communicated over the network 106. In some examples, the DNS message logger 112 can be part of the DNS server 108, or alternatively, can be separate from the DNS server 108. The DNS message logger 112 can log detected DNS messages into a log of DNS messages 114, which can be stored in a storage medium 116. This storage medium 116 can be implemented using a storage device or alternatively, multiple storage devices.

Generally, a "DNS message" can include a DNS query, a DNS reply (to a DNS query), as well as any other type of message that is communicated for looking up a network address corresponding to a domain name.

The DNS message logger 112 can be implemented as a hardware processing circuit, which can include any one or some combination of the following: a microprocessor, a core of a multi-core microprocessor, a microcontroller, a programmable integrated circuit, a programmable gate array, or any other hardware processing circuit. Alternatively, the DNS message logger 112 can be implemented as a combination of a hardware processing circuit and machine-readable instructions (software and/or firmware) executable on the hardware processing circuit.

A DGA domain identification engine 118 can analyze each of the DNS messages in the log of DNS messages 114, to identify DGA domain names. As used here, an "engine" can refer to a hardware processing circuit, or alternatively, an "engine" can refer to a combination of a hardware processing circuit and machine-readable instructions executable on the hardware processing circuit.

In other examples, instead of processing DNS messages from the log of DNS messages 114, the DGA domain identification engine 118 can instead process each DNS message as the DNS message is communicated over the network 106 and detected by the DGA domain identification engine 118. In such examples, the DNS message logger 112 can be omitted.

To determine whether a domain name in a DNS message is a DGA domain name, the DGA domain identification engine 118 can also consult a whitelist of (known) benign domain names 120. The whitelist of benign domain names 120 can refer to any data collection of domain names. The benign domain names included in the whitelist 120 are domain names that have been identified to not be DGA generated, based on historical data or based on expertise or knowledge of an entity, including a human, a machine, or a program. Any domain name that is included in the whitelist of benign domain names 120 would not be considered further by the DGA domain identification engine 118.

The DGA domain identification engine 118 can count a number of digits in a domain name, where each digit is a number, a symbol, or a character that is not in a language of the domain name. For example, in the domain name "15xy299e*555h.com," the number of digits is 9 (1, 5, 2, 9, 9,*, 5, 5, 5). As another example, in the domain name "x7z4ΔλN2abc.org," the number of digits is 6 (7, 4, Δ, λ, Ṅ, 2). In the latter example, it is assumed that the domain name is in the English language, and thus the digits Δ, λ, and Ṅ (in addition to the numbers) are not considered to be English language characters.

The DGA domain identification engine 118 can use a DGA domain threshold 124 for determining whether a value derived based on the number of digits in the domain name is indicative of the domain name being a DGA domain name. Details regarding calculation of the value derived based on the number of digits in a domain name are provided further below.

Any DGA domain name identified by the DGA domain identification engine 118 can be stored in a storage medium 126. As depicted in FIG. 1, the storage medium 126 includes DGA domain names 128 identified by the DGA domain identification engine 118. The storage medium 126 includes a storage device (or multiple storage devices), and can be the same or different from the storage medium 116.

An infected device identification engine 130 can use the identified DGA domain names 128 and an infected device threshold 132 for determining whether each electronic device (such as the electronic device 102 or 104) is infected with malware that produces DGA domain names.

Information pertaining to a malware-infected electronic device, as identified by the infected device identification engine 130, can be provided to a remediation engine 134, which can take action to address the malware-infected electronic device. Information relating to a malware-infected electronic device can include any or some combination of the following: a network address of the electronic device, a name of the electronic device, a location of the electronic device, an owner of the electronic device, information pertaining to the malware that has infected the electronic device, and so forth.

Remediation actions that can be performed by the remediation engine 134 can include any or some combination of the following: blocking the malware-infected electronic device from accessing the network 106, disabling the malware-infected electronic device (such as by shutting it down), performing a malware cleaning process on the malware-infected electronic device, sending an alert to an administrator or other user, and so forth.

In other examples, the remediation engine 134 can be omitted, with the infected device identification engine 130 sending an alert to an administrator or other user regarding an identified malware-infected electronic device.

Although FIG. 1 shows the DNS message logger 112, DGA domain identification engine 118, infected device identification engine 130, and remediation engine 134 as being separate nodes, it is noted that in other examples, some combination or all of the logger 112 and engines 118, 130, and 134 can be part of a common computing node, where a "computing node" can refer to computer or an arrangement of multiple computers.

Figure 2:
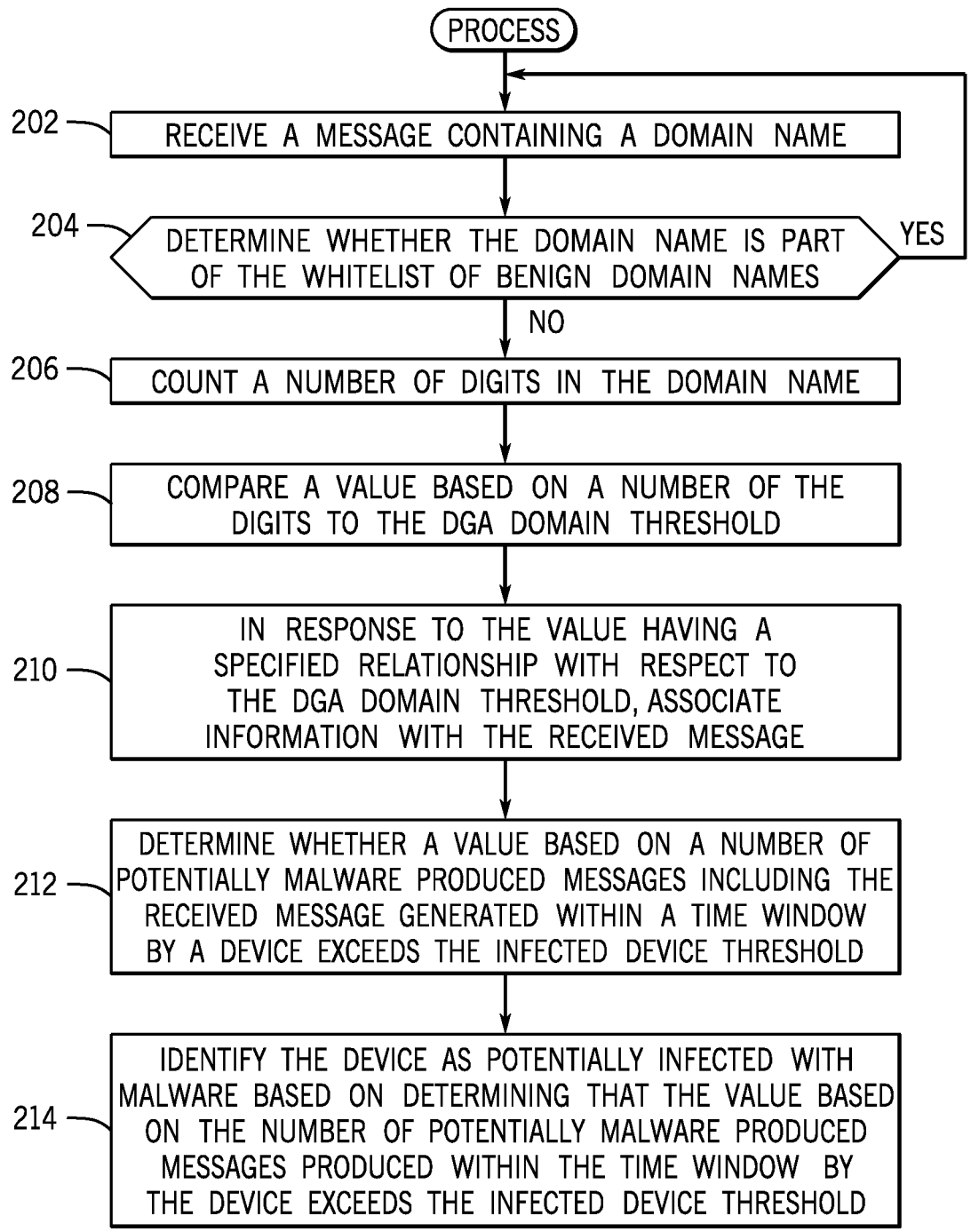
FIG. 2 is a flow diagram of a process according to some examples.

FIG. 2 is a flow diagram of a process that can be performed by the network arrangement 100 according to some examples. The process receives (at 202) a message containing a domain name, where the message can include a DNS query submitted by an electronic device over the network 106 to the DNS server 108. In other examples, the message can include another type of DNS message, or any other message including a domain name. The receiving of the message containing the domain name can be by the DNS message logger 112 and/or by the DGA domain identification engine 118.

The DGA domain identification engine 118 determines (at 204) whether the domain name is part of the whitelist of benign domain names 120. In response to determining that the domain name is part of the whitelist of benign domain names 120, no further action is performed on the domain name by the DGA domain identification engine 118.

In response to determining that the domain name is not part of the whitelist of benign domain names 120, the process of FIG. 2 performs the following. The DGA domain identification engine 118 counts (at 206) a number of digits in the domain name. The DGA domain identification engine 118 compares (at 208) a value based on the number of digits to the DGA domain threshold 124. The value derived based on the number of the digits can be one of the following: (1) the number of the digits in the domain name, or (2) a value that is computed by applying a function or expression to the number of the digits. In some examples, a value based on the number of the digits is a fraction computed based on dividing the number of digits by the total number of characters (including digits and non-digits) in the domain name. In other examples, other values can be computed based on the number of digits.

In response to the value (based on the number of digits) having a specified relationship (e.g., greater than, less than, equal to, etc.) with respect to the DGA domain threshold 124, the DGA domain identification engine 118 associates (at 210) information with the received message, where the information that is associated can include a timestamp of the message, a network address from which the message was sent, and a domain name in the message.

The timestamp of the message can be the time at which the message was transmitted by an electronic device or received by a receiving device, such as the DNS query logger 112 and/or the DGA domain identification engine 118. In further examples, additional or different information can be associated with the received message, including a length of the message, the value derived based on the number of digits in the domain name, or other information.

The received message with which the information is associated is potentially produced by malware (such a message can also be referred to as a "DGA message," i.e., a message containing a potentially identified DGA domain name).

In some examples, the DGA domain identification engine 118 can include a tag with each message including a domain having a number of digits for which a value is derived that has the specified relationship with respect to the DGA domain threshold 124. The tag can be set to a specified value to indicate that the message is identified as being potentially produced by malware. This tag can be included in the information associated (at 210) with the message.

In alternative examples, the DGA domain identification engine 118 does not include the tag with the message identified as being potentially produced by malware.

The infected device identification engine determines (at 212) whether a value based on a number of potentially malware produced messages (DGA messages), including the received message, generated within a time window by a device has a specified relationship (less than, or greater than, equal to, or some predefined relationship) with respect to the infected device threshold 132. The value based on the number of DGA messages can equal to a count of the number of DGA messages, or can be based on a value computed based on the number of DGA messages (e.g., a fraction calculated by dividing the number of DGA messages by the total number of messages). The determination of whether messages occur in a time window can be based on timestamps associated with the messages, and the determination of whether messages are transmitted by a particular device can be based on network addresses associated with the messages.

The infected device identification engine 130 identifies (at 214) the device as potentially infected with malware based on determining that the value based on the number of potentially malware produced messages (DGA messages) produced within the time window by the device having the specified relationship with respect to the infected device threshold 132.

In some examples, a system can examine each electronic device (or network address) that issued a high volume of non-DGA messages (messages that do not include domain names identified as potentially being DGA domain names). The domain names included in the non-DGA messages can potentially be added to the whitelist of benign domain names 120 (assuming the domain names are not already in the whitelist 120).

Each of the DGA domain threshold 124 and infected device threshold 132 (FIG. 1) can be predefined or can be computed based on input information. Each threshold 124 or 132 can be one of: (1) a global threshold that is common for different users or groups of users, or (2) an individual threshold tailored to a user or group of users.

In examples where the threshold 124 or 132 is computed, a system can determine true positive rates and false positive rates for respective different thresholds.

For computing the DGA domain threshold 124, a collection of known DGA domain names and a collection of known benign domain names can be supplied to the system, such as the system shown in FIG. 1. For each of different values of the DGA domain threshold 124 tested, the output of the DGA domain identification engine 118 that processes the collection of known DGA domain names and the collection of known benign domain names can be examined. Statistical analysis of the output can produce a true positive rate of the DGA domain identification engine 118, which is the rate at which the DGA domain identification engine 118 correctly identified a DGA domain name as a DGA domain name. The statistical analysis can also produce a false positive rate, which is the rate at which the DGA domain identification engine 118 identified a benign domain name as a DGA domain name.

Based on the true positive rate and false positive rate (or any other statistical measure produced by the statistical analysis) for DGA domain name detection, the system can select from among the different values of the DGA domain threshold 124 based on comparing the true positive rates and the false positive rates for the respective different threshold values.

The true positive rate and false positive rate of the output produced by the infected device identification engine 130 can similarly be computed using a collection of malware infected devices and a collection of non-malware infected devices, with a comparison of the true positive rates and false positive rates for malware-infected device identification of the respective different values of the infected device threshold 132 used to select a value of the infected device threshold 132.

By using techniques or mechanisms according to some implementations, timely and reliable detection of DGA domain names and malware infected devices can be achieved. By being able to detect a malware infected device early, a security action can be taken to prevent the malware infected device from establishing a communication with a C2 server. Also, by being able to detect a DGA domain name early, a security action can be taken to block a response to a DNS message that includes the DGA domain name, and further, to identify the device that issued the DNS message including the DGA domain name.

Figure 3:
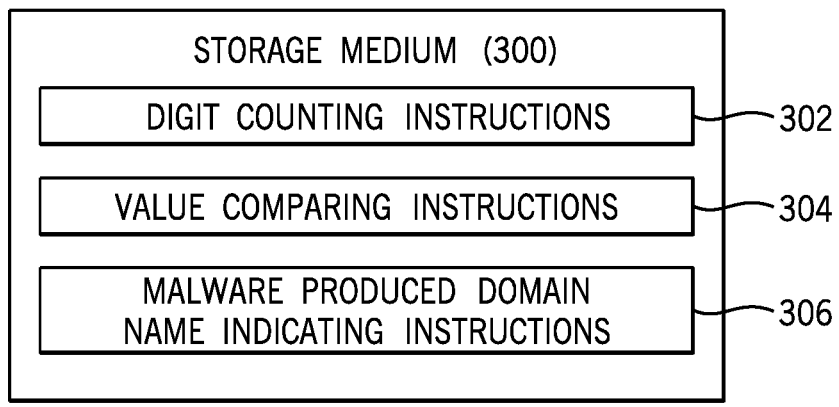
FIG. 3 is a block diagram of a storage medium storing machine-readable instructions according to further examples.

FIG. 3 is a block diagram of a non-transitory machine-readable or computer-readable storage medium 300 that stores machine-readable instructions that upon execution cause a system to perform various tasks. The machine-readable instructions include digit counting instructions 302 to count a number of digits in a domain name. The machine-readable instructions further include value comparing instructions 304 to compare a value derived based on a number of the digits to a threshold. The machine-readable instructions further include malware produced domain name indicating instructions 306 to indicate that the domain name is potentially generated by malware in response to the value having a specified relationship with respect to the threshold.

Figure 4:
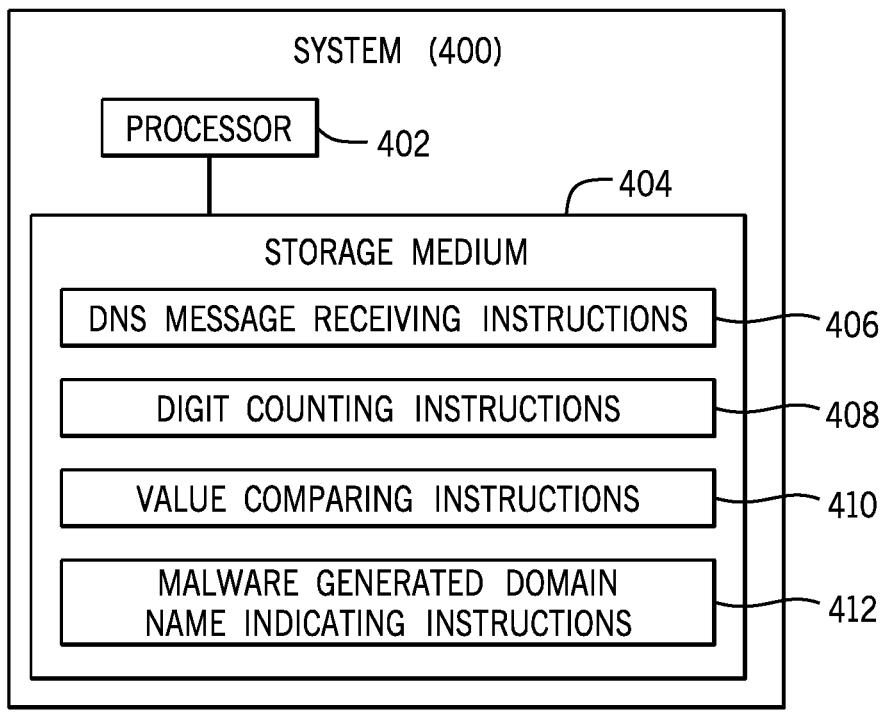
FIG. 4 is a block diagram of a system according to other examples.

FIG. 4 is a block diagram of a system 400 that includes a processor 402 and a non-transitory storage medium 404 storing machine-readable instructions executable on the processor 402 to perform various tasks. A processor can include a microprocessor, a core of a multi-core microprocessor, a microcontroller, a programmable integrated circuit, a programmable gate array, or another hardware processing circuit. Instructions executable on a processor can refer to the instructions executable on a single processor, or executable on multiple processors.

The machine-readable instructions include DNS message receiving instructions 406 to receive a DNS message including a domain name. The machine-readable instructions further include digit counting instructions 408 to count a number of digits in the domain name. The machine-readable instructions further include value comparing instructions 410 to compare a value based on a number of the digits to a threshold. The machine-readable instructions additionally include malware generated domain name indicating instructions 412 to indicate that the domain name is potentially generated by malware in response to the value having a specified relationship with respect to the threshold.

The storage medium 300 (FIG. 3) or 404 (FIG. 4) can include any or some combination of the following: a semiconductor memory device such as a dynamic or static random access memory (a DRAM or SRAM), an erasable and programmable read-only memory (EPROM), an electrically erasable and programmable read-only memory (EEPROM) and flash memory; a magnetic disk such as a fixed, floppy and removable disk; another magnetic medium including tape; an optical medium such as a compact disk (CD) or a digital video disk (DVD); or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A non-transitory machine-readable storage medium storing instructions that upon execution cause a system to:
    count a number of digits in a domain name;
    apply a function to the number of digits to compute a domain identification value;
    access a threshold tailored for a user or group of users;
    compare the domain identification value based on the number of digits to the threshold;
    receive a message containing the domain name; and
    indicate that the domain name is potentially generated by malware in response to the domain identification value having a first specified relationship with the threshold, the indicating including associating a tag with the message, wherein the associated tag includes a domain having a second number of digits used to derive a tag value having the first specified relationship with the threshold.

2. The non-transitory machine-readable storage medium of claim 1, wherein the domain identification value is computed using a count of the number of the digits.

3. The non-transitory machine-readable storage medium of claim 1, wherein the domain name is according to a first language, and the digits of the number of the digits include a digit selected from among a number, a symbol, and a non-first language character.

4. The non-transitory machine-readable storage medium of claim 1, wherein
the associated tag is set to a specified value to indicate that the message is potentially generated by malware.

5. The non-transitory machine-readable storage medium of claim 4, wherein the instructions upon execution cause the system to further:
associate further information with the message, the associated further information comprising a timestamp of the message, a network address of a device from which the message was sent, and the domain name.

6. The non-transitory machine-readable storage medium of claim 5, wherein the instructions upon execution cause the system to further:
using the timestamp of the message, determine whether a value based on a number of messages generated by the device from which the message was sent within a time window and tagged as potentially generated by malware has a second specified relationship with another threshold; and
identify the device as a malware-infected device in response to the value based on the number of messages tagged as potentially generated by malware having the second specified relationship with the another threshold.

7. The non-transitory machine-readable storage medium of claim 6, wherein the instructions upon execution cause the system to further:
determine true positive rates and false positive rates of malware infected device identification for respective different values of the another threshold; and
select from among the respective different values of the another threshold based on a comparison of the true positive rates and the false positive rates of malware infected device identification for the respective different values of the another threshold, wherein the another threshold is based on the selection.

8. The non-transitory machine-readable storage medium of claim 4, wherein the instructions upon execution cause the system to further:
receive a message containing the domain name, wherein to indicate that the domain name is potentially generated by malware the instructions upon execution cause the system to further:
associate information with the message containing the domain name, the associated information including the domain identification value, and
send the message containing the domain name and the associated information to a processing engine to determine whether the message containing the domain name is potentially generated by malware.

9. The non-transitory machine-readable storage medium of claim 8, wherein the message containing the domain name comprises a domain name system (DNS) message.

10. The non-transitory machine-readable storage medium of claim 1, wherein the count, the comparison, and the indication are performed in response to the domain name not being in a whitelist of benign domain names.

11. The non-transitory machine-readable storage medium of claim 1, wherein the instructions upon execution cause the system to further:
determine true positive rates and false positive rates of malware generated domain name detection for respective different values of the threshold, and
select from among the respective different values of the threshold based on a comparison of the true positive rates and the false positive rates of malware generated domain name detection for the respective different values of the threshold.

12. A system comprising:
a processor; and
a non-transitory storage medium storing instructions executable on the processor to:
receive a domain name system (DNS) message including a domain name;
count a number of digits in the domain name;
apply a function to the number of digits to compute a domain identification value;
compare the domain identification value to a threshold;
determine that the domain name is potentially generated by malware in response to the domain identification value having a specified relationship with the threshold;
responsive to the determination that the domain name is potentially generated by malware, associate, with the DNS message, a tag indicating that the DNS message is potentially generated by malware, the associated tag including a domain having a second number of digits used to derive a tag value having the specified relationship with the threshold; and
transmit the DNS message and the associated tag to be processed to determine whether a device that issued the DNS message is infected with malware.

13. The system of claim 12, wherein the instructions are executable on the processor to determine whether the domain name is in a whitelist of benign domain names, and wherein the counting, the comparing, and the indicating are performed in response to determining that the domain name is not in the whitelist of benign domain names.

14. The system of claim 12, wherein the instructions are executable on the processor to:
determine, based on the associated tag, whether a value based on a number of potentially malware produced DNS messages issued by the device that issued the DNS message is infected with malware within a time window has a specified relationship with another threshold, each of the number of potentially malware produced DNS message including a domain name indicated as potentially generated by malware; and
identify the device as malware infected in response to determining that the value based on the number of potentially malware produced DNS messages within the time window has the specified relationship with the another threshold.

15. The system of claim 14, wherein the instructions are executable on the processor to:
take a security action with respect to the identified device.

16. A method executed by a system comprising a processor, comprising:
receiving a message containing a domain name, the received message comprising a domain name system (DNS) message and a tag indicating that the DNS message is potentially generated by malware;

determining whether the domain name is part of a whitelist of benign domain names; and in response to determining that the domain name is not part of the whitelist of benign domain names:

counting a number of digits in the domain name;

applying a function to the number of digits to compute a domain identification value;

comparing the domain identification value to a first threshold tailored for a user or group of users; and in response to the domain identification value having a specified relationship with the first threshold:

associating a timestamp and a network address with the received message, determining, using the timestamp and the network address, whether a value based on a number of potentially malware produced messages, including the received message, that are generated within a time window by a device exceeds a second threshold, and identifying the device as potentially infected with malware based on determining that the value based on the number of potentially malware produced messages generated within the time window by the device exceeds the second threshold, and wherein the tag includes a domain having a second number of digits used to derive a value having the specified relationship with the first threshold.

17. The method of claim 16, wherein the received message comprises a domain name system (DNS) message.

18. The method of claim 17, the method further comprising analyzing the DNS message to determine whether the device is infected with malware responsive to the tag indicating that the DNS message is potentially generated by malware.

19. The method of claim 16, the method further comprising:

associating further information with the received message, the associated further information comprising a timestamp of the received message and the domain name.

20. The method of claim 16, the method further comprising:

taking a security action with respect to the identified device.

* * * * *